United States Patent
Lensch (10) Patent No.: US 12,369,527 B2
(45) Date of Patent: Jul. 29, 2025

(54) BUBBLE UP AUGER FOR COMBINE HARVESTER

(71) Applicant: CNH Industrial America LLC, New Holland, PA (US)

(72) Inventor: Kyle Lensch, Bennett, IA (US)

(73) Assignee: CNH Industrial America LLC, New Holland, PA (US)

( * ) Notice: Subject to any disclaimer, the term of this patent is extended or adjusted under 35 U.S.C. 154(b) by 969 days.

(21) Appl. No.: 17/470,398

(22) Filed: Sep. 9, 2021

(65) Prior Publication Data

US 2023/0072267 A1    Mar. 9, 2023

(51) Int. Cl.
| | |
|---|---|
| A01D 61/00 | (2006.01) |
| A01D 41/12 | (2006.01) |
| A01D 90/02 | (2006.01) |
| A01F 12/46 | (2006.01) |

(52) U.S. Cl.
CPC ....... *A01D 61/004* (2013.01); *A01D 41/1208* (2013.01); *A01D 90/02* (2013.01); *A01F 12/46* (2013.01)

(58) Field of Classification Search
CPC .... A01D 41/1217; A01D 90/02; A01D 90/10; A01F 12/46
See application file for complete search history.

(56) References Cited

U.S. PATENT DOCUMENTS

| | | | |
|---|---|---|---|
| 3,550,793 A | * | 12/1970 | Garner ............... A01D 41/1217 198/667 |
| 4,029,228 A | | 6/1977 | Shaver |
| 5,695,398 A | * | 12/1997 | Carlson .............. A01D 41/1208 460/119 |
| 5,695,399 A | | 12/1997 | Carlson et al. |
| 7,585,214 B1 | | 9/2009 | Johnson et al. |

(Continued)

FOREIGN PATENT DOCUMENTS

| | | | |
|---|---|---|---|
| EP | 2074880 A1 | | 7/2009 |
| GB | 839386 | * | 6/1960 |
| WO | WO-2010093599 A1 | * | 8/2010 ............. A01B 73/00 |

OTHER PUBLICATIONS

Extended European Search Report for EP Application No. 22194967.0 dated Jan. 11, 2023 (six pages).

*Primary Examiner* — Christopher J Sebesta
*Assistant Examiner* — Ashley A Kaercher
(74) *Attorney, Agent, or Firm* — Rebecca Henkel; Richard K. DeMille; Peter K. Zacharias (57) ABSTRACT

A bubble-up auger assembly for an agricultural vehicle includes a rotatable shaft having flightings and a first connection end that is configured to be releasably engaged with an input shaft for rotating the rotatable shaft. A tube surrounds the rotatable shaft. A linkage guides movement of the auger assembly between a raised position and a lowered position. In the raised position, the connection end of the rotatable shaft is positioned to be engaged with the input shaft. In the lowered position, the connection end of the rotatable shaft is positioned to be separated from the input shaft. As the auger assembly is moved from the raised position to the lowered position, in a first movement, the linkage is configured to initially translate the auger assembly in a first direction, and in a second movement, the linkage is configured to rotate the auger assembly to the lowered position.

12 Claims, 7 Drawing Sheets

(56) References Cited

U.S. PATENT DOCUMENTS

| | | |
|---|---|---|
| 8,146,974 B2 | 4/2012 | Horst |
| 9,215,843 B2 | 12/2015 | Cooksey et al. |
| 9,775,297 B2 | 10/2017 | Ricketts et al. |
| 9,907,228 B2 | 3/2018 | Vandevelde et al. |
| 10,399,787 B2 | 9/2019 | Rodrigues et al. |
| 11,019,767 B2 | 6/2021 | Banks et al. |
| 2005/0011732 A1 | 1/2005 | Matousek et al. |
| 2007/0102260 A1* | 5/2007 | Reimer .............. A01D 41/1217 198/313 |
| 2009/0215509 A1 | 8/2009 | Johnson et al. |
| 2020/0128736 A1* | 4/2020 | Banks, Jr ............... B65G 33/32 |
| 2020/0154641 A1* | 5/2020 | Van Mill ................... B60P 1/42 |

* cited by examiner

BUBBLE UP AUGER FOR COMBINE HARVESTER

FIELD OF THE INVENTION

The present invention relates to agricultural harvesters. More specifically, the present invention relates to a bubble up auger for a combine harvester.

BACKGROUND OF THE INVENTION

As is described in U.S. Pat. No. 9,775,297 to CNH America LLC (the '297 patent), which is incorporated by reference in its entirety and for all purposes, a combine harvester generally includes a header which cuts the crop. The header then moves the cut crop into a feeder house. The feeder house lifts the cut crop into the threshing, separation and cleaning areas of the agricultural combine. The grain is separated from crop stalk by a rotor or threshing system. The grain is then cleaned, transported, and stored in a grain tank. The chaff and trash are deposited from the rear of the agricultural combine. The grain stored in the grain tank is eventually discharged through a grain tank unloader tube.

More particularly, grain enters a clean grain elevator typically positioned on one side of the combine. The elevator is an endless chain elevator with a series of lift arms attached to the chain. The arms lift the grain upwards. Near the top of the elevator the grain is deposited to a base of a bubble up auger. The bubble up auger moves the grain towards the center of the grain tank. At the end of the bubble up auger the grain is discharged into the grain tank's center. Conventional bubble up augers are hinged near the base of the auger so that the auger can rotate or pivot to a transport, or substantially horizontal position. To discharge the grain from the grain tank, there is an auger positioned at the bottom of the grain tank. This grain tank auger moves grain to a grain tank unloading auger. The grain tank unloading auger is extended away from the grain tank and discharges the grain into a nearby transport vehicle.

The bubble up auger is hinged at the base of the auger, as mentioned above. The auger may be divided into an upper portion that is pivotably mounted to a stationary lower portion. The ends of the upper and lower auger portions typically include bearings and hangers for those bearings. Such bearings and bearing hangers add cost, complexity and reduce efficiency. Specifically, bearing hangers can create interruptions and flow restrictions that increase wear on auger components. These interruptions also consume more power throughout the grain handling system, and can damage clean grain. Bearings consume power (i.e., windage losses) as they are often filled with oil or grease that consume power to overcome the fluid friction forces (hydrodynamic forces).

In view of the foregoing, it would be desirable to improve upon the structure and functionality of the bubble up auger.

SUMMARY OF THE INVENTION

According to one aspect of the invention, a bubble-up auger assembly for an agricultural vehicle includes a rotatable shaft having flightings and a first connection end that is configured to be releasably engaged with an input shaft for rotating the rotatable shaft. A tube surrounds the rotatable shaft. A linkage guides movement of the auger assembly between a raised position and a lowered position. In the raised position, the connection end of the rotatable shaft is positioned to be engaged with the input shaft. In the lowered position, the connection end of the rotatable shaft is positioned to be separated from the input shaft. As the auger assembly is moved from the raised position to the lowered position, in a first movement, the linkage is configured to initially translate the auger assembly in a first direction, and in a second movement, the linkage is configured to rotate the auger assembly to the lowered position.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

The bubble-up auger assembly is shown schematically in FIGS. 3-6.

DETAILED DESCRIPTION OF THE INVENTION

Corresponding reference characters indicate corresponding parts throughout the several views. The exemplification set out herein illustrates an embodiment of the invention, in one form, and such exemplification is not to be construed as limiting the scope of the invention in any manner.

Inasmuch as various components and features of harvesters are of well-known design, construction, and operation to those skilled in the art, the details of such components and their operations will not generally be discussed in significant detail unless considered of pertinence to the present invention or desirable for purposes of better understanding.

In the drawings, like numerals refer to like items, certain elements and features may be labeled or marked on a representative basis without each like element or feature necessarily being individually shown, labeled, or marked, and certain elements are labeled and marked in only some, but not all, of the drawing figures.

The terms "grain", "chaff", "straw", and "tailings" are used principally throughout this specification for convenience but it is to be understood that these terms are not intended to be limiting. Thus "grain" refers to that part of the crop material that is threshed and separated from the discardable part of the crop material, which is referred to as chaff and includes straw, seeds, and other non-grain crop material.

Figure 1:
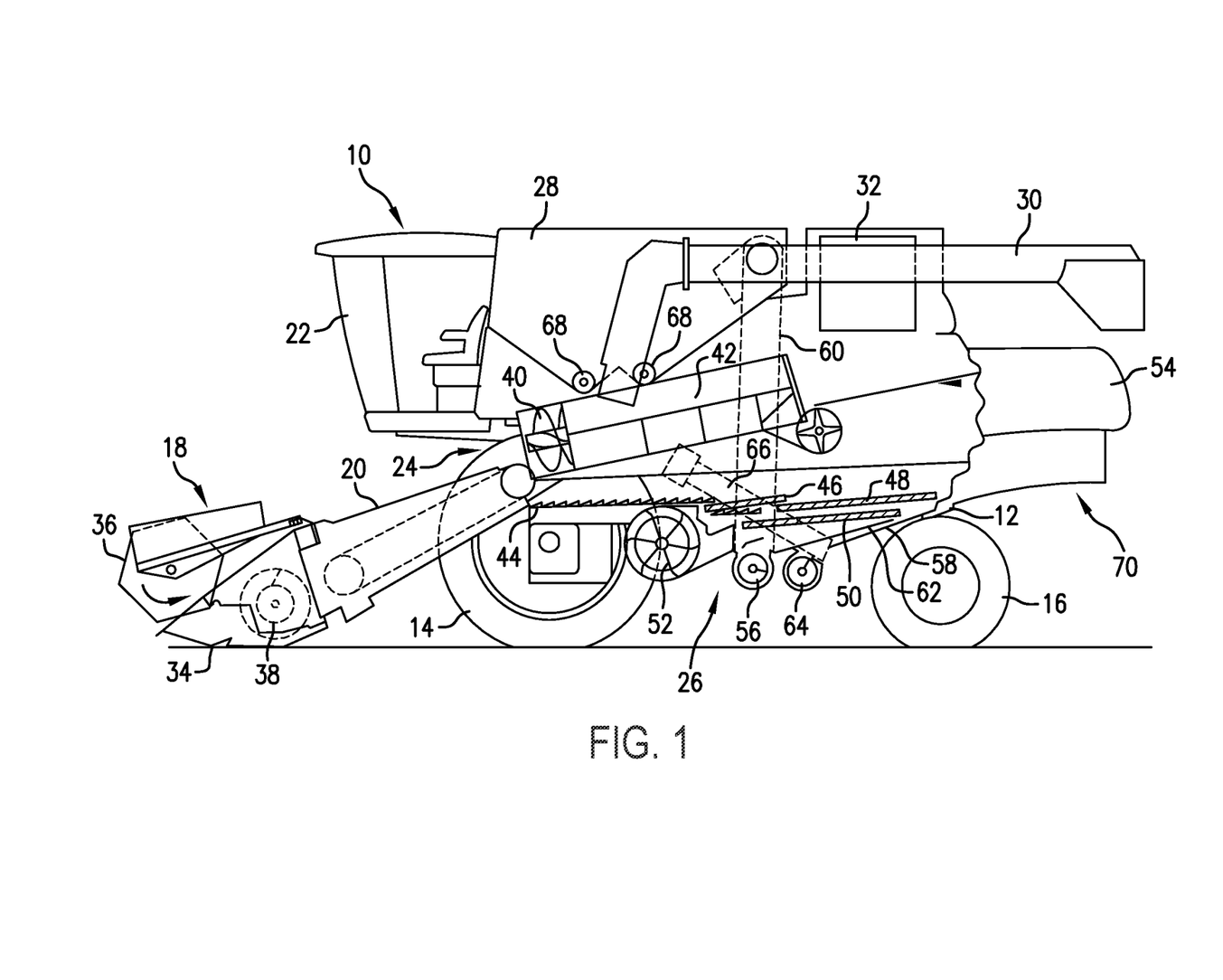
FIG. 1 is a side view of an embodiment of an agricultural harvester in the form of a combine.

As is described in U.S. Pat. No. 9,907,228, which is incorporated by reference herein in its entirety, FIG. 1 depicts an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30. Unloading conveyor 30 is illustrated as an unloading auger, but can also be configured as a belt conveyor, chain elevator, etc. Motive force is selectively applied to front wheels 14 through a power plant in the form of a diesel engine 32 and a transmission (not shown).

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24.

Threshing and separating system 24 generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an airflow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and in front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. Cross augers 68 at the bottom of grain tank 28 convey the clean grain within grain tank 28 to unloading auger 30 for discharge from combine 10.

Figure 2A:
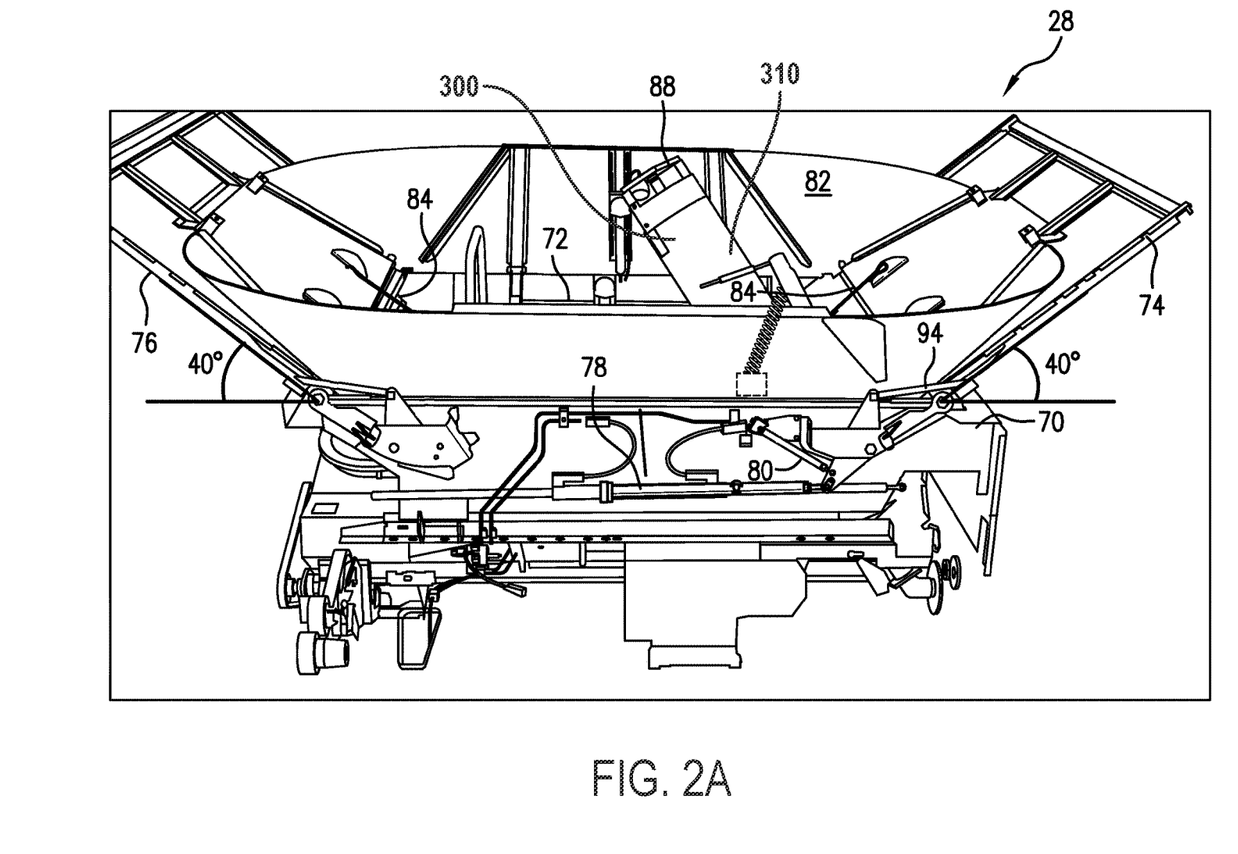
FIG. 2A is a side view of a grain tank of the combine of FIG. 1 with tank cover sections shown in an open position.

FIG. 2A depicts grain tank 28, which includes frame 70 having an opening 72 formed therethrough, a pair of tank cover sections 74 and 76 that are movably associated with the frame 70, an actuator 78 linked to the tank cover section 74, and a force assistor 80 linked to the tank cover section 74. The tank cover section 74 is connected to front and rear covers of the grain tank 28 by a linkage system (not shown) inside the grain tank 28, so that the tank cover section 74 and front and rear covers always move together. As can be seen, the frame 70 forms the body of the grain tank 28 and can be expanded by the tank cover sections 74 and 76, the front and rear covers, a bubble up extension, as well as an expandable element 82 that is raised and lowered with the tank cover sections 74 and 76. In this sense, the capacity of the grain tank 28 can be increased by raising the tank cover sections 74 and 76 as well as the expandable element 82, which is shown as four rubber corners moving together with the tank cover sections 74 and 76.

The tank cover sections 74 and 76, as well as the unnumbered front and rear covers, are movably associated with the frame 70 so that they can switch between an open position (shown in FIG. 2A), and a covering position (not shown) relative to the opening 72. As shown, the tank cover sections 74 and 76 are hinged to the frame 70 by hinges 84 so the tank cover sections 74 and 76 can pivot about axes of rotation defined by the hinges 84 to an opening angle relative to the opening 72, shown as 40 degrees in FIG. 2A. While the tank cover sections 74 and 76 are shown as being hinged to the frame 70, it is contemplated that the tank cover sections 74 and 76 could be movably associated with the frame 70 in other ways, such as by sliding.

A bubble up auger assembly 300 is mounted to the tank cover section 74 so that as the tank cover section 74 pivots about its hinge 84, the bubble up auger assembly 300 can be raised and lowered within the grain tank 28 relative to the opening 72. This allows for an output end 88 of the bubble up auger assembly 300 to raise and lower as the capacity of the grain tank 28 changes, which can correspond to increasing and decreasing amounts of grain held within the grain tank 28. This is important for fill distribution and to lower power consumption by preventing the output end 88 from being buried under too much grain or being held too high above the grain level.

The details regarding movement of tank cover sections 74 and 76 may vary from that which are shown and described herein.

Bubble up auger assembly 300 moves the grain towards the center of the grain tank 28. At the end of the bubble up auger assembly 300 the grain is discharged into the grain tank's center. Auger assembly 300 generally includes an auger shaft having flights that are surrounded by a tube 310. Bubble up auger assembly 300 is hinged near the base of the auger so that the auger can move to a transport, or substantially horizontal position. Further details regarding bubble up auger assembly 300 will be described hereinafter.

Figure 2B:
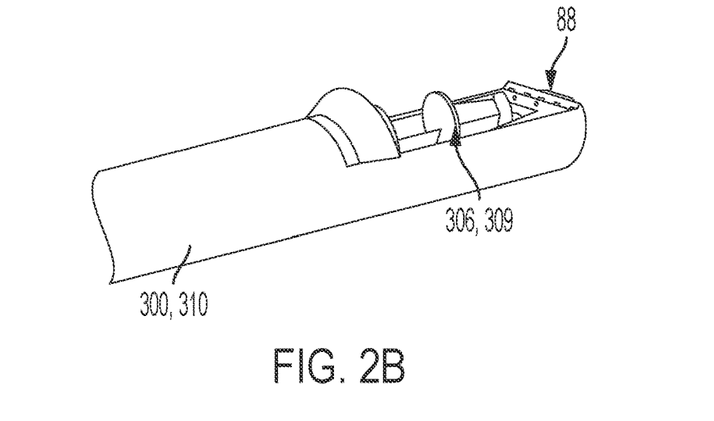
FIG. 2B is an isometric view of an output end of a bubble-up auger assembly.
Figure 3:
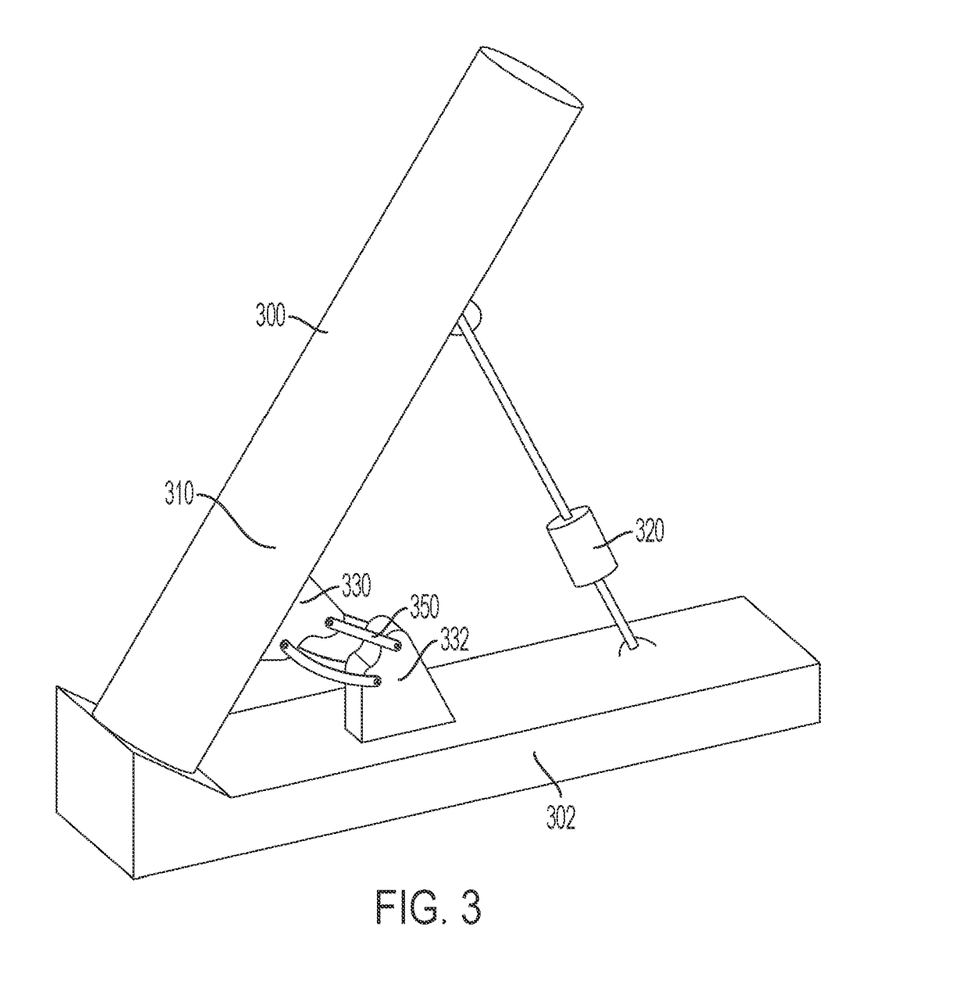
FIG. 3 is a detailed view of the bubble-up auger assembly shown mounted to a section of the grain tank of FIG. 2A, wherein the auger is shown in a fully-raised position.
Figure 4:
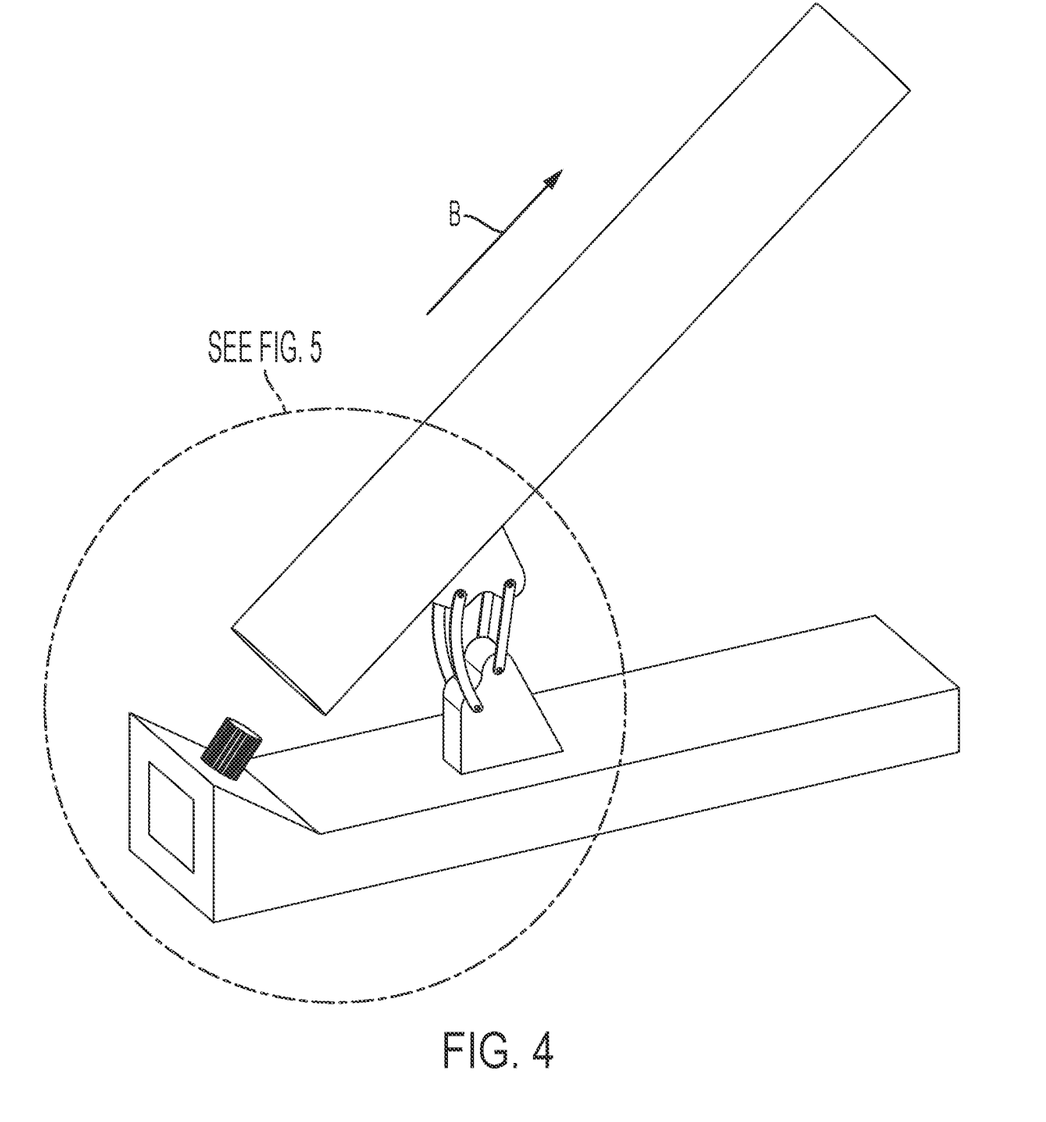
FIG. 4 is another view of the bubble-up auger of FIG. 3, wherein the auger is assembly shown in a partially-raised position.
Figure 5:
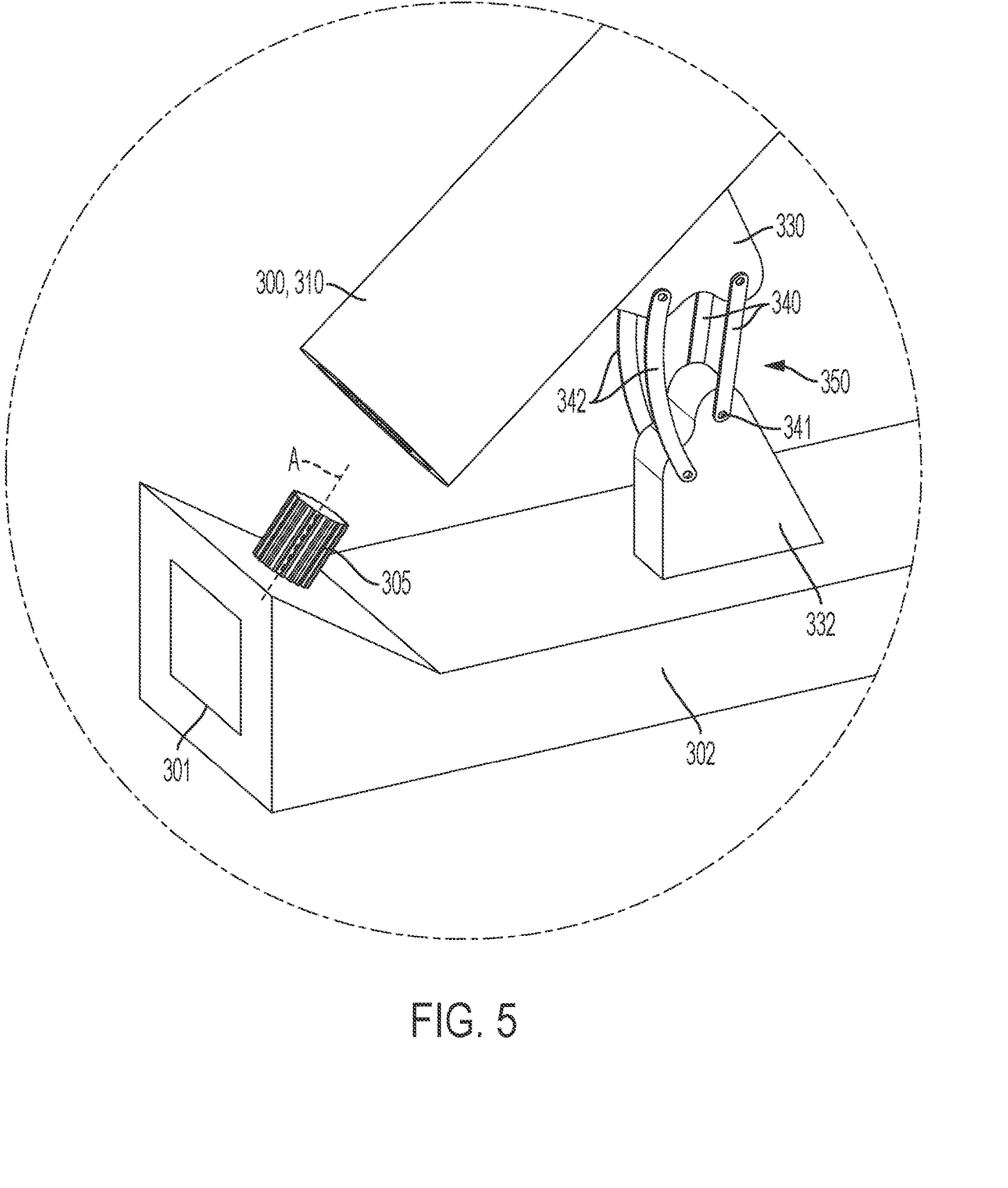
FIG. 5 is a detailed view of FIG. 4.
Figure 6:
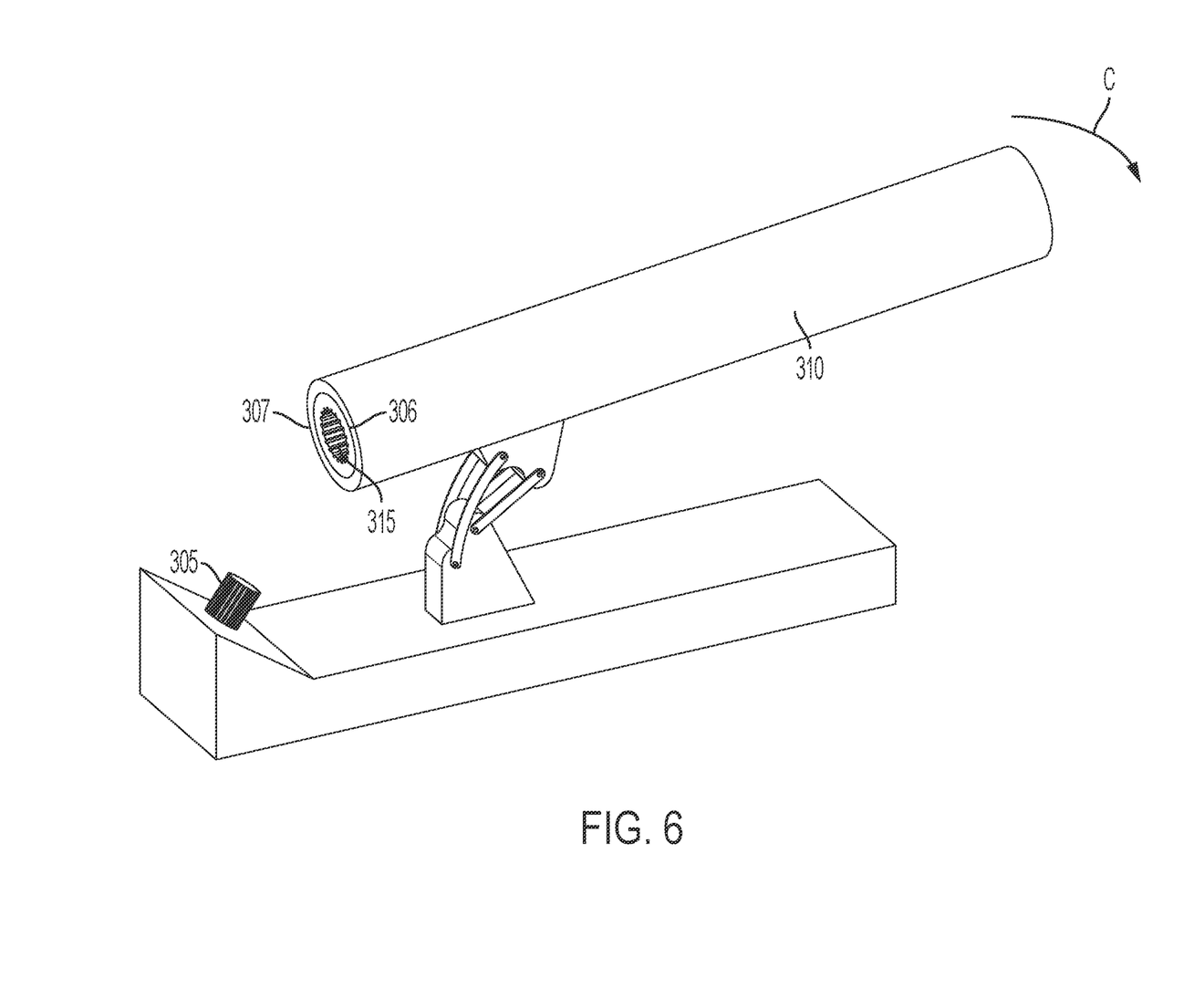
FIG. 6 is another view of the bubble-up auger assembly of FIG. 3, wherein the auger is shown in a fully-lowered position.

FIGS. 3-6 depict bubble up auger assembly 300 and corresponding devices for causing movement of auger assembly 300 between the raised position of FIG. 3 and the lowered position of FIG. 6. Auger assembly 300 includes a rotatable cylindrical shaft 306 having flightings 309 (i.e., screw threads) that may be welded or otherwise fixed to the outer surface of shaft 306. Flightings 309 are shown in FIG. 2B. The flightings 309 of auger shaft 306 are described in greater detail in the '297 patent. Shaft 306 is surrounded by a hollow tube 310. Shaft 306 may be coupled to tube 310 by one or more bearings, for example, such that shaft 306 may rotate with respect to tube 310. Tube 310 does not rotate with shaft 306. In operation, grain is propelled by shaft 306 through tube 310. Although tube 310 has a circular cross-section it should be understood that the cross-section may vary, and may be square or rectangular, for example.

Turning now to FIGS. 5 and 6, a gearbox assembly 301 (shown schematically) is positioned within a base structure 302. Base structure 302 is either mounted to or is integrated with the bottom surface (or other surface) of tank 28. Gearbox assembly 301 is driven by an electric motor, hydraulic motor, or gear that is indirectly connected to engine 32. The output of gearbox assembly 301 is connected to an input shaft 305. Input shaft 305 has splines extending along its axis of rotation A, as shown. Input shaft 305 rotates about axis A with respect to base structure 302, but input shaft 305 does not translate along axis A. Input shaft 305 is configured to be releasably connected to auger shaft 306. According to one aspect, shaft 305 forms part of auger assembly 300, and, according to another aspect, shaft 305 does not form part of auger assembly 300.

More particularly, a connection end 307 of shaft 306 includes an opening 315 for receiving input shaft 305. Opening 315 is straight and extends axially. Opening 315 is splined for engaging with the splines of input shaft 305, such that opening 315 (along with the entire auger assembly 300) and input shaft 305 are non-rotatably connected together. In other words, when input shaft 305 is connected to opening 315, shafts 305 and 306 will rotate together. The connection between input shaft 305 and opening 315 is a sliding fit (i.e., sliding in the axial direction A). The leading edges of input shaft 305 and opening 315 may be chamfered to ease insertion and accommodate for any misalignment. It should be understood that various others ways exist for non-rotatably and releasably coupling input shaft 305 and auger shaft 306, such as pins, fasteners, non-circular shaft and corresponding opening, and so forth.

A mount 330 extends from the lower surface of tube 310 at a location closer to end 307. Mount 330 may be either integrated with or fixedly connected to the outer surface of tube 310. Another mount 332 extends from the upper surface of structure 302 at a location beneath mount 330. Mount 332 may be either integrated with or fixedly connected to structure 302.

Two forward links 340 are pinned to and extend between mounts 330 and 332. Links 340 are positioned on opposite sides of the mounts 330, 332. Each end of link 340 is capable of pivoting about a pin 341 that connects that end to one of the mounts 330, 332. Similarly, two rearward links 342 are pinned to and extend between mounts 330 and 332. Links 342 are also positioned on opposite sides of the mounts 330, 332. Each end of link 342 is capable of pivoting about a pin 341 that connects that end to one of the mounts 330, 332. Rearward links 342 are positioned closer to input shaft 305 than forward links 340. Links 340 are substantially straight, whereas links 342 are curved about an axis that is orthogonal to axis A. Stated differently, rearward links 342 have a greater curvature than forward links 340. Links 340 and 342 may be composed of steel, for example.

Links 340 and 342, mount 330 and mount 332 together form a 4-bar closed linkage 350. Unlike a conventional hinge that rotates about a single axis, linkage 350 facilitates both rotation and translation. More particularly, due to the design of linkage 350, when auger assembly 300 initially moves from the raised position of FIG. 3 toward the lowered position of FIG. 6, auger assembly 300 translates along axis A (substantially without rotation) so that auger assembly 300 does not damage input shaft 305 as opening 315 decouples from input shaft 305. See arrow B in FIG. 4.

After auger assembly 300 has detached from input shaft 305, and, as auger assembly 300 moves further toward the lowered position of FIG. 6, auger assembly 300 begins to rotate in the downward direction until auger assembly 300 reaches the lowered and stowed position shown in FIG. 6. See arrow C in FIG. 6. Auger assembly 300 follows the opposite path back as it moves in the opposite direction from the lowered position of FIG. 6 back to the raised position shown in FIG. 3 (e.g., rotation followed by translation).

Even if auger assembly 300 experiences slight rotation when auger assembly 300 initially moves from the raised position of FIG. 3 toward the lowered position of FIG. 6, that slight rotation is to a lesser extent than the rotation experienced when auger assembly 300 moves further toward the lowered position of FIG. 6.

Turning now to FIG. 3, an actuator 320 (shown only in FIG. 3) is connected to base structure 302 and tube 310 for moving auger assembly 300 between the raised and lowered positions shown in FIGS. 3-6. The connection ends of actuator 320 are pivotably connected to connection points on base structure 302 and tube 310 by bearings such that actuator 320 does not impede movement of auger assembly 300, and vice versa. Actuator 320 may be powered hydraulically or electrically, for example. The locations of the connections may vary. For example, actuator 320 may be connected to one of the links 340/342 of linkage 350. Alternatively, actuator 320 may be positioned at the interface between tube 310 and structure 302. As another alternative, actuator 320 may be connected to the grain tank covers by a linkage, for example. The actuator 320 shown is one example of an actuator, and the invention is not limited to the details of that actuator.

Figure 7:
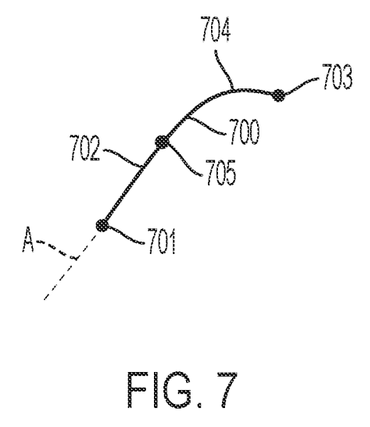
FIG. 7 depicts the trajectory of the end of bubble-up auger assembly between the fully-raised and fully-lowered positions.

Turning now to FIG. 7, that figure depicts the trajectory 700 of the connection end 307 of bubble-up auger assembly 300 as assembly 300 moves between the fully-raised position at 701 and the fully-lowered position at 703. As was described above, as auger assembly 300 moves from the fully-raised position at 701 to the fully-lowered position at 703, end 307 initially translates (substantially without rotation) along axis A and straight line 702 in a first movement. At the point 705 along trajectory 700 where assembly 300 clears and separates from input shaft 305, end 307 then begins to rotate (or move) along arc 704 in a second movement until assembly 300 reaches the fully-lowered position at 703.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A bubble-up auger assembly for an agricultural vehicle, said bubble-up auger assembly comprising:
   a rotatable shaft having flightings and a first connection end that is configured to be releasably engaged with an input shaft for rotating the rotatable shaft;
   a tube surrounding and connected to the rotatable shaft;
   a four bar linkage connected to the tube that is configured to guide movement of the tube between a raised position and a lowered position, wherein, in the raised position, the connection end of the rotatable shaft is positioned to be engaged with the input shaft, and in the lowered position, the connection end of the rotatable shaft is positioned to be separated from the input shaft, wherein, as the tube is moved from the raised position to the lowered position, in a first movement, the linkage is configured to initially translate the tube along a straight path and in a first direction, and in a second movement that follows the first movement, the linkage is configured to rotate the tube along a curved path to the lowered position, wherein, using said four bar linkage, the first movement of the tube occurs substantially without rotation such that a degree of rotation of the tube in the second movement is greater than a degree of rotation of the tube in the first movement.

2. The bubble-up auger assembly of claim 1, further comprising the input shaft that is configured to releasably engage the rotatable shaft, wherein, when the input shaft is engaged with the rotatable shaft, rotation of the input shaft causes rotation of the rotatable shaft, wherein the input shaft is rotatable about an axis of rotation.

3. The bubble-up auger assembly of claim 2, wherein, in the first movement, the linkage is configured to initially translate the tube in the first direction along the axis of rotation.

4. The bubble-up auger assembly of claim 3, wherein, the first movement ceases once the rotatable shaft is separated from the input shaft.

5. The bubble-up auger assembly of claim 1, wherein the linkage comprises a first link that is pivotably mounted to both the tube and a stationary base structure, and a second link that is also pivotably mounted to both the tube and the stationary base structure.

6. The bubble-up auger assembly of claim 5, wherein the first and second links are pivotably coupled to both the tube and the stationary base structure by pins.

7. The bubble-up auger assembly of claim 5, wherein the first link is positioned closer to the connection end than the second link.

8. The bubble-up auger assembly of claim 7, wherein the first link is curved and the second link is straight.

9. The bubble-up auger assembly of claim 5, further comprising a pair of the first links and a pair of the second links.

10. The bubble-up auger assembly of claim 1, wherein the connection end of the rotatable shaft is configured to be non-rotatably connected to the input shaft.

11. A grain tank for the agricultural vehicle comprising the bubble-up auger assembly of claim 1.

12. An agricultural harvester comprising the bubble-up auger assembly of claim 1.

* * * * *